US008250176B2

(12) United States Patent
Ohtani

(10) Patent No.: US 8,250,176 B2
(45) Date of Patent: Aug. 21, 2012

(54) FILE SHARING METHOD AND FILE SHARING SYSTEM

(75) Inventor: Atsuhisa Ohtani, Tokyo (JP)

(73) Assignee: NEC Corporation, Tokyo (JP)

( * ) Notice: Subject to any disclaimer, the term of this patent is extended or adjusted under 35 U.S.C. 154(b) by 1389 days.

(21) Appl. No.: 11/785,947

(22) Filed: Apr. 23, 2007

(65) Prior Publication Data

US 2007/0250594 A1  Oct. 25, 2007

(30) Foreign Application Priority Data

Apr. 25, 2006  (JP) .................................. 2006-121355

(51) Int. Cl.
*G06F 15/16* (2006.01)
*G06F 15/173* (2006.01)
*G06F 15/177* (2006.01)

(52) U.S. Cl. ...................... 709/218; 709/217; 709/219

(58) Field of Classification Search .............. 709/218, 709/217, 219
See application file for complete search history.

(56) References Cited

U.S. PATENT DOCUMENTS

| 5,873,085 | A | 2/1999 | Enoki et al. |
| 6,609,213 | B1* | 8/2003 | Nguyen et al. ............... 714/4 |
| 7,653,699 | B1* | 1/2010 | Colgrove et al. ............. 709/213 |
| 2002/0138559 | A1* | 9/2002 | Ulrich et al. ................. 709/203 |
| 2002/0156840 | A1* | 10/2002 | Ulrich et al. ................. 709/203 |
| 2002/0161973 | A1* | 10/2002 | Ulrich et al. ................. 711/114 |
| 2003/0105816 | A1* | 6/2003 | Goswami ...................... 709/204 |
| 2004/0078467 | A1* | 4/2004 | Grosner et al. ............... 709/226 |
| 2004/0117438 | A1* | 6/2004 | Considine et al. ............ 709/203 |
| 2004/0205143 | A1 | 10/2004 | Uemura |
| 2004/0225719 | A1* | 11/2004 | Kisley et al. ................. 709/212 |
| 2006/0101025 | A1* | 5/2006 | Tichy et al. .................. 707/100 |

FOREIGN PATENT DOCUMENTS

| JP | 10-003421 | 1/1998 |
| JP | 1-120063 | 4/1999 |
| JP | 2000-040026 A | 2/2000 |
| JP | 2004-240803 A | 8/2004 |

OTHER PUBLICATIONS

Cluster File Systems, Inc; Lustre: A Scalable, High-Performance File System; published Nov. 11, 2002; retrieved from http://eugen.leitl.org/whitepaper.pdf.*
Fu et al, Group Sharing and Random Access in Cryptographic Storage File Systems, Jun. 1999, retrieved from http://groups.csail.mit.edu/cis/theses/fu-masters.pdf; 77 pages.*
Lustre: A Scalable, High-Performance File System Cluster File Systems, Inc. http://www.lustre.org/docs/whitepaper.pdf, 13 pp.

* cited by examiner

*Primary Examiner* — Haresh N Patel
*Assistant Examiner* — Chau Le
(74) *Attorney, Agent, or Firm* — Foley & Lardner LLP

(57) ABSTRACT

System and method to perform rapid I/O processing for a large file reducing load on a server computer and a network. The client computer accesses a disk device directly to perform input/output processing relating to a file operation through a channel switch based on real file information obtained by the client computer from a parent server computer upon a file-open operation. Further, a child server computer manages the disk device, which enables different real files in a same virtual file to be processed an I/O at the same time by a plurality of client computers.

3 Claims, 10 Drawing Sheets

FILE SHARING METHOD AND FILE SHARING SYSTEM

FIELD OF THE INVENTION

The present invention relates to a file sharing method and an improvement of a file sharing system for storing a large file in a virtual file system constructed over a real file system on a plurality of disk devices.

DESCRIPTION OF THE RELATED ART

A method for sharing a file on a system comprising a Meta-data server, a plurality of object storage server, and clients is proposed as Non-Patent Document 1, titled Lustre: A Scalable, High-Performance File System Cluster File Systems, Inc.

The file sharing method comprises a Meta-data server having only management information for the file system, an object storage server for performing only I/O to/from a plurality of disks, and a client requests I/O processing of each disk based on file management information obtained from the Meta-data server, so that file sharing is realized.

The conventional file sharing method having such a structure operates as follows. For example, as for a process in which a client refers to a file, the client requests a Meta-data of a file, to which the client would like to refer, from the Meta-data server. The Meta-data server sends the Meta-data for the requested file to the client. The client requests the corresponding object storage server to refer to the file based on the Meta-data. The object storage server reads the file corresponding to the Meta-data from a disk device and sends it to the client.

However, this conventional technology has following problems. A first one is that the Meta-data server may not be able to process at once a number of I/O requests received from a number of clients due to heavy load on the server. The reason is that the clients have to request Meta-data of files to be I/O target from the Meta-data server at the I/O processing.

A second problem is that I/O processing may delay because one object storage server cannot keep up with a number of meta-data to perform I/O sent by a number of clients. The reason is that the clients have to request I/O of the object storage server by sending Meta-data to the object storage server.

A third problem is that data transfer may delay due to increased network load when a number of clients request a number of I/O. The reason is that the clients send/receive I/O data to/from the object storage server through the network.

Further, Japanese Patent Application Laid-open 11-120063, Patent Document 1, proposes a shared file system in which a file management computer for processing file management information only and other computers configuring clients are connected through a network, and the file management computer sends a client file management information with respect to a file requested by the client through the network, then the client accesses directly to a shared disk not through a network based on the file management information so as to perform a file operation.

However, the system needs the file management computer to send file management information to the client at every file operation, which has a problem, as well as the above, that the file management computer and the network may be heavily loaded when requests from a number of clients gather at the file management computer.

Further, a plurality of clients cannot access the same file at once because clients' accesses are controlled at each file exclusively. Therefore, when a large file is handled in a virtual file system with a plurality of disk devices integrated, each real file cannot be written or performed with other processes at once even if those real files are dispersed in different disks.

SUMMARY OF THE INVENTION

It is an object of the present invention to provide a file sharing method and a file sharing system with which inconvenience with the above conventional technologies is resolved, with which I/O processing for a large file can be performed rapidly by reducing loads on a server computer and a network, and with which files even in a same virtual file system are accessible at once from a plurality of client computers as long as real files are different.

The present invention relates to a file sharing method and a file sharing system in which a child server computer for managing a plurality of disk devices, a parent server computer for managing the child server computers, and a plurality of client computers are communicably connected, and in which a large file is divided and stored into the disk devices. In order to achieve the above object, the file sharing method and the file sharing system particularly comprises configurations for:

connecting the client computers, the child server computers and the parent server computer through a network, and also connecting the plurality of disk devices, the respective client computers and the respective child server computers through a channel switch; and registering a structure of real file systems in the respective disk devices, a structure of a virtual file system over the real file systems, and real file information specifying a storage location of a real file in the virtual file system in advance in the parent server computer as a file management database; wherein the client computer sends a request to the parent server computer through the network to obtain real file information corresponding to a target file from the parent server computer upon a file-open operation by the client computer, and the client computer directly accesses the disk devices through the channel switch to perform I/O processing relating to a file operation based on the real file information.

For example, as shown in FIG. 1, a child server computer 3 at each disk device 4, a parent server computer 2 managing a plurality of child server computers 3, and a plurality of client computers 1 are connected through a network such as Ethernet (registered trademark), and also a plurality of disk devices 4, each client computer 1, and each child server computer 3 are connected through a channel switch 5 in a fabric topology.

Further, a plurality of child server computers 3 shares management of one large file system as shown in FIG. 2, and a plurality of child server computers 3 also shares management of one enormous file as shown in FIG. 3.

Each child server computer 3 has a real file system to manage individually, which the parent server computer 2 shows to the client computer 1 as if these are one file system (a virtual file system).

Further, a divided portion of the large file is arranged in each real file system, which the parent server computer 2 shows to the client computer 1 as if these are one file (a virtual file).

Upon a file-open operation, the client computer 1 requests information on the child server computer 3 in which a corresponding file exists and information on the file of the parent server computer 2 through the network. At that time, the parent server computer 2 searches a corresponding child server computer 3 from a file management database, and performs a LOOKUP processing for the child server computer 3 to obtain a file handle of the corresponding file, then obtains the file handle which is an identifier for specifying one file or one directory in the virtual file system.

Then the client computer 1 receives real file information which is required to specify a structure of the real file system, a structure of the virtual file system over the real file systems, and a storing location of a real file in the virtual file system, that is, information on an IP address of the child server computer 3, a file offset, a file handle and the like, from the parent server computer 2.

Upon an I/O processing such as read-out or write-in, the client computer 1 sends an I/O request to the child server computer 3 managing the corresponding file data, based on the real file information received from the parent server computer 2, without involving the parent server computer 2.

Because the number of the file-open operation is generally less than the number of read-out or write-in, the parent server computer 2 is not loaded heavily even with a number of client computers 1.

Moreover, I/O data is transmitted directly between the client computer 1 and the corresponding disk device 4 through the channel switch 5, without involving the parent server computer 2, the child server computer 3, and the network, so that even the child server computer 3 and network are not heavily loaded.

Furthermore, the disk devices 4 are managed by child server computers 3 at each disk device 4, so that a plurality of client computers 1 can perform write-in processing at same time to different real files on the same virtual file.

Further, when a termination of the real file in the disk device 4 is detected while the client computer 1 performs I/O processing relating to the file operation to/from the disk device 4 based on the real file information, the client computer 1 requests real file information about a continuing real file with respect to the real file from the parent server computer 2.

Accordingly, even if a file is large and stored in a plurality of disk devices 4 dispersed, the client computer 1 can smoothly carry on the I/O processing relating to read-out or write-in.

Further, the client computer 1 stores real file information obtained from the parent server computer 2 into a file management table, and upon a file-open operation, the client computer 1 determines whether real file information corresponding to the target file is stored or not in the file management table, and in the case where the real file information is stored, the client computer 1 sends a request for I/O processing directly to a child server computer managing the target real file information based on the real file information stored in the file management table to start I/O processing relating to a file operation, While in the case where the real file information is not stored, a request is sent to the parent server computer 2 through the network, so that real file information corresponding to the target file is to be obtained from the parent server computer 2.

When the real file information about the file to be operated is stored in the file management table, there is no need for the client computer 1 to access the parent server computer 2 to obtain the real file information, which can reduce further loads on the parent server computer 2 and the network.

According to the file sharing method and the file sharing system of the present invention, the client computer directly access the disk device through the channel switch to perform an I/O processing relating to a file operation based on the real file information obtained from the parent server computer, upon the file-open operation, so that the client computer does not need to access the parent server computer during the I/O processing such as read-out or write-in, and that the parent server computer is not loaded heavily even with a number of client computers.

Further, I/O data is transferred directly between the client computer and the corresponding disk device through the channel switch, without involving the parent server computer, the child server computer, and the network, so that the child server computer and the network are not loaded heavily as well.

Furthermore, the disk devices are managed by respective child server computers at each disk device, so that a plurality of client computers can perform an I/O processing, in particular a processing relating to write-in, at once to/from different real files on the same virtual file.

DESCRIPTION OF PREFERRED EMBODIMENT

Next, one embodiment for a file sharing system to which a file sharing method according to the present invention is applied will be specifically explained.

Figure 4:
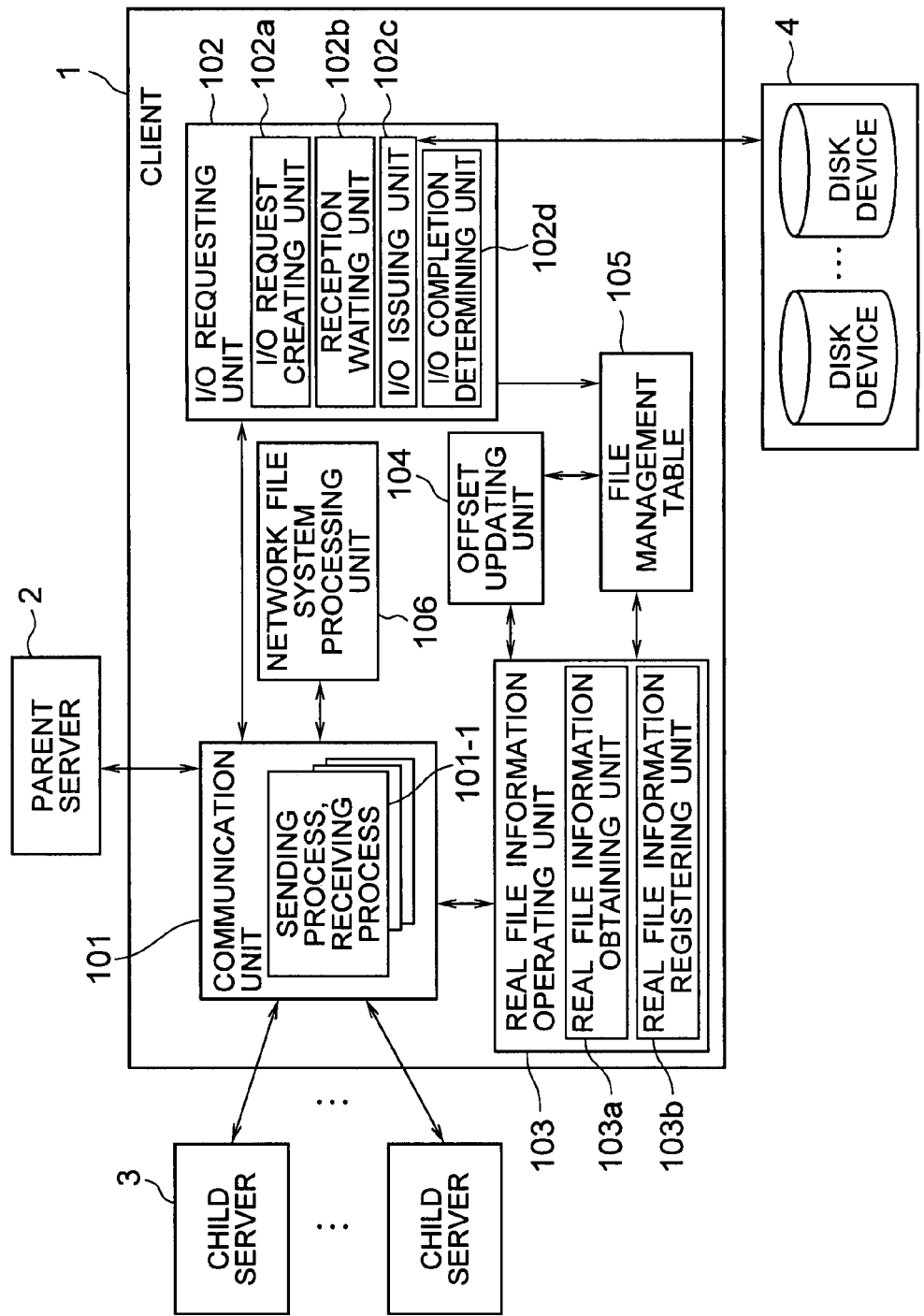
FIG. 4 is a functional block diagram showing an outline for a structure of a client computer.
Figure 5:
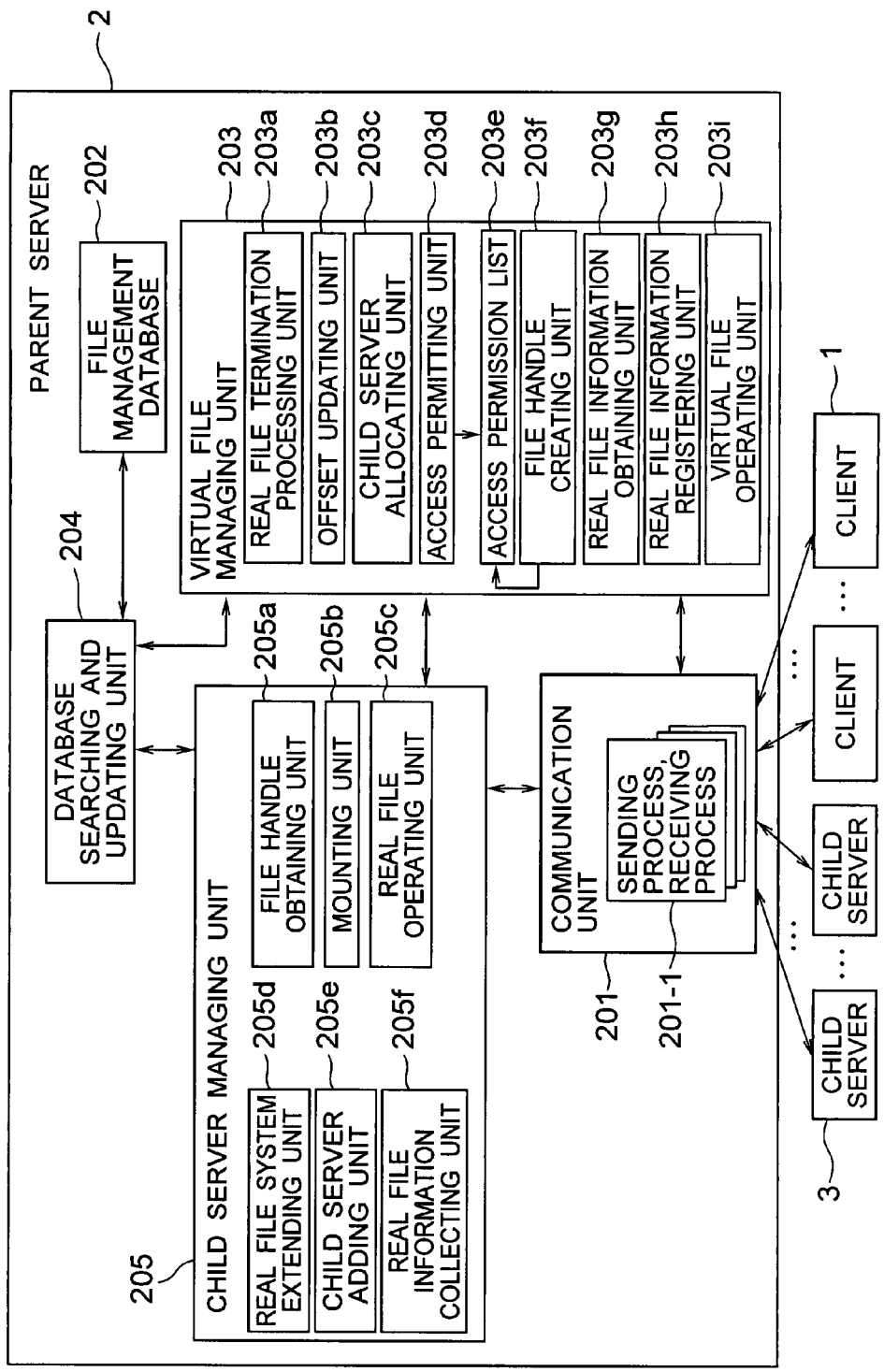
FIG. 5 is a functional block diagram showing an outline for a structure of a parent server computer.
Figure 6:
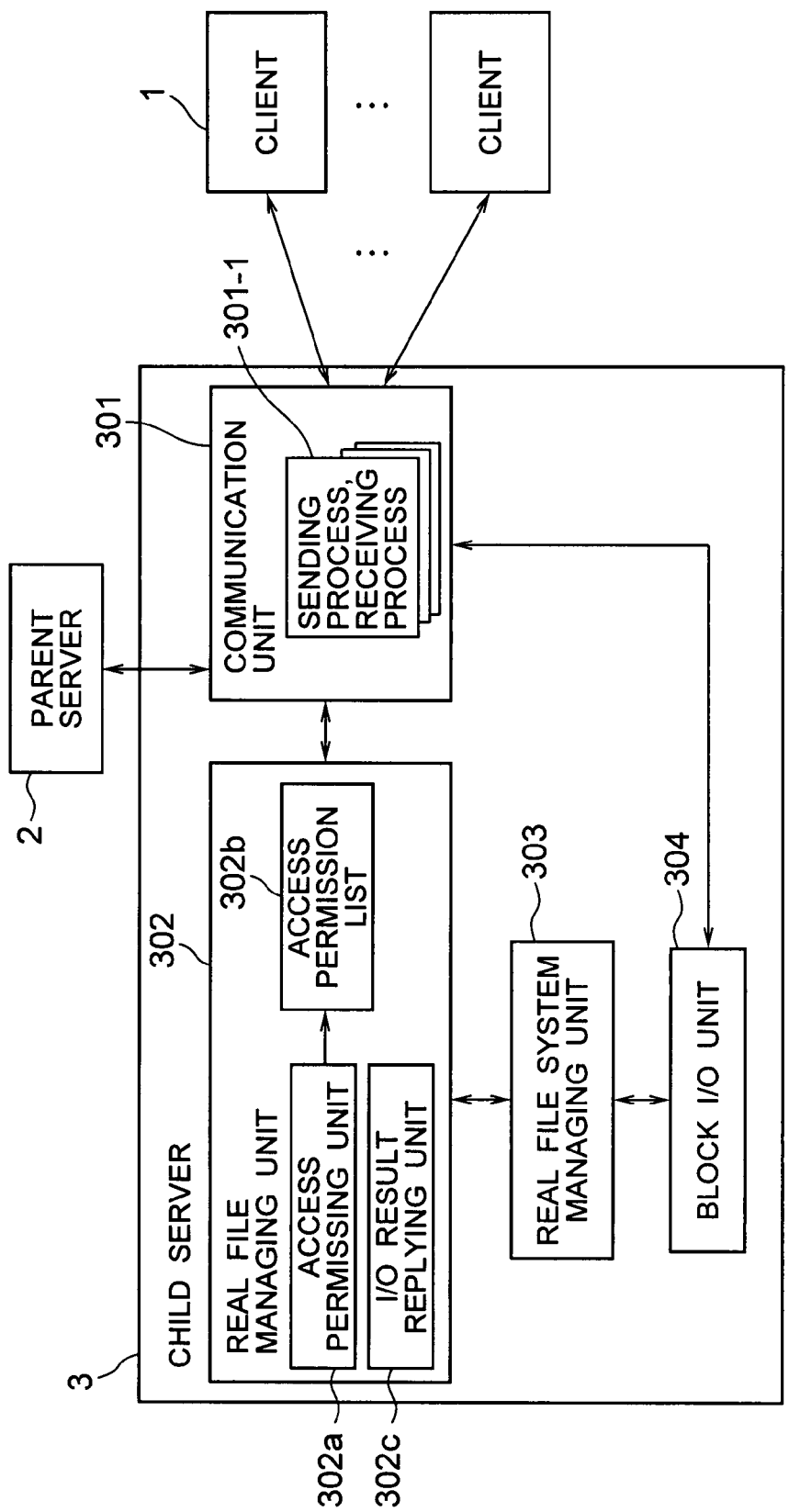
FIG. 6 is a functional block diagram showing an outline for a structure of a child server computer.

FIG. 4 is a functional block diagram showing an outline of a structure of the client computer 1 (hereinafter, simply referred to as client 1) mainly, FIG. 5 is a functional block diagram showing an outline of a structure of the parent server computer 2 (hereinafter, simply referred to as parent server 2) mainly, and FIG. 6 is a functional block diagram showing an outline of a structure of the child server computer 3 (hereinafter, simply referred to as child server 3) mainly.

Figure 2:
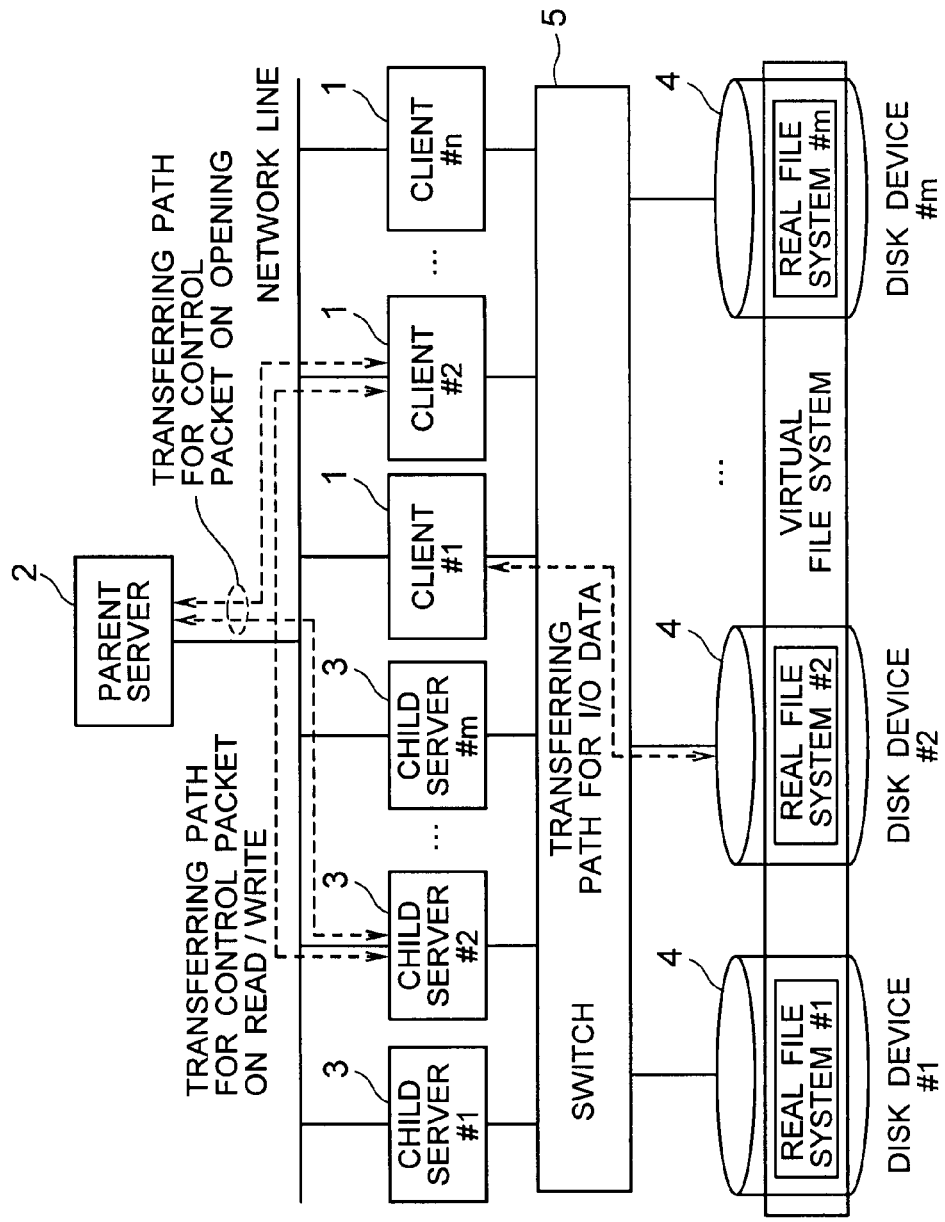
FIG. 2 is a conceptual diagram showing a simplified relationship between a virtual file system and real file systems.
Figure 3:
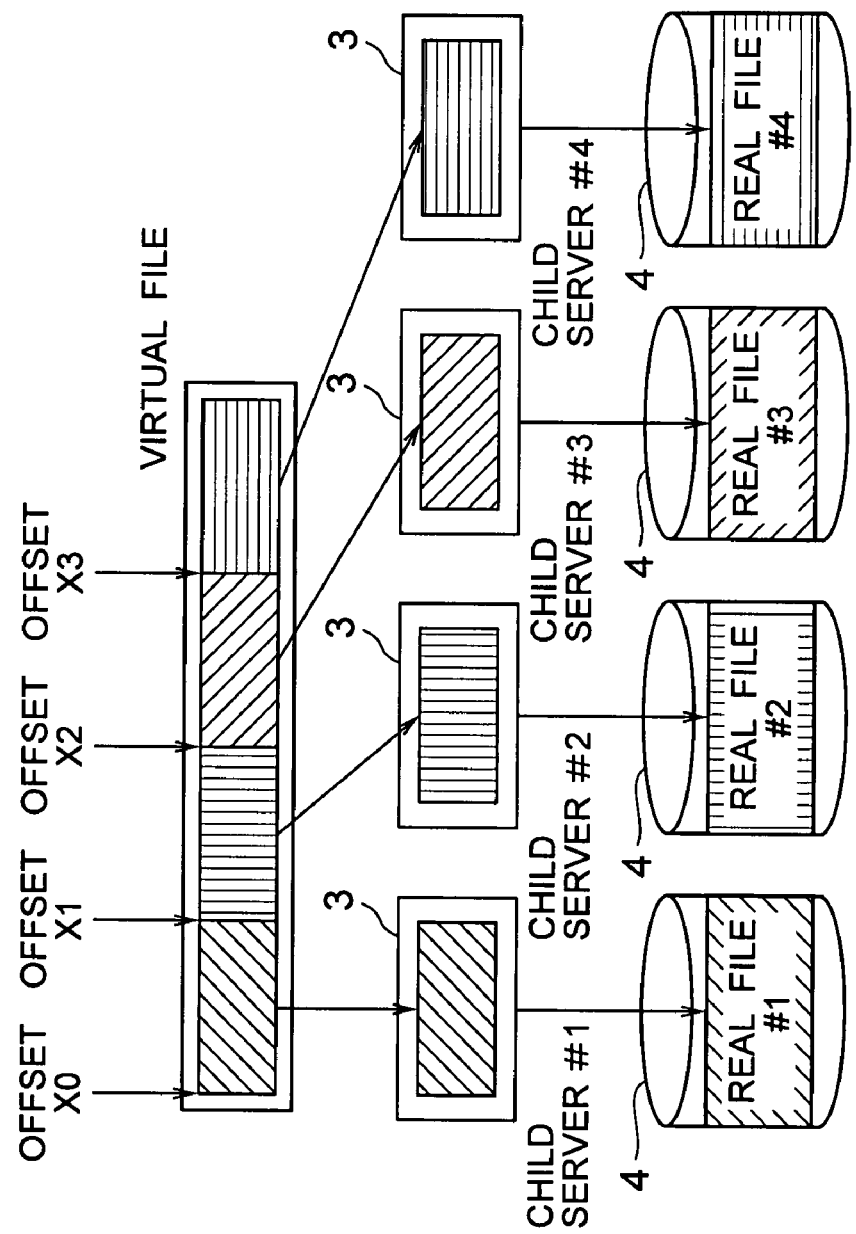
FIG. 3 is a conceptual diagram showing a simplified relationship between a virtual file and real files.

As shown in FIGS. 4-6, the file sharing system according to the present invention comprises the clients 1, the parent server 2, the child servers 3, and the disk devices 4, besides, as shown in FIG. 2, the child servers 3, the parent server 2, and the clients 1 are connected through a network such as Ethernet communicably, at the same time, the disk devices 4, the clients 1, and the child servers 3 are connected through the channel switch 5 in a fabric topology.

The client 1, as shown in FIG. 4, comprises a communication unit 101, an I/O requesting unit 102, a real file information operating unit 103, an offset updating unit 104.

The I/O requesting unit 102 includes an I/O request creating unit 102a, a reception waiting unit 102b, and an I/O issuing unit 102c, and besides the real file information operating unit 103 includes a real file information obtaining unit 103a, and a real file information registering unit 103b.

Further, as shown in FIG. 5, the parent server 2 comprises a communication unit 201, a file management database 202, a virtual file managing unit 203, a database searching/updating unit 204, and a child server managing unit 205.

The virtual file managing unit 203 includes a real file termination processing unit 203a, an offset updating unit 203b, a child server allocating unit 203c, an access permitting unit 203d, an access permission list 203e, a file handle creating unit 203f, a real file information obtaining unit 203g, and a real file information registering unit 203h, and besides the child server managing unit 205 includes a file handle obtaining unit 205a, a mounting unit 205b, a real file operating unit 205c, a real file system extending unit 205d, a child server adding unit 205e, and a real file information collecting unit 205f.

Further, as shown in FIG. 6, the child server 3 comprises a communication unit 301, a real file managing unit 302, a real file system managing unit 303, a block I/O unit 304. The real file managing unit 302 includes an access permitting unit 302a, an access permission list 302b, and an I/O result replying unit 302c.

Each of the client 1, the parent server 2, the child server 3, and the disk device 4 operates as in the following overview.

[Client 1]

The client 1 is a computer which is operated by a user process executing an application program, and there is a plurality of clients 1 in a system in general.

The communication unit 101 performs communication between the clients 1 and the parent server 2, or the clients 1 and the arbitrary child server 3. The communication unit 101 uses a general communication protocol such as TCP/IP to communicate, and establishes connection between each communication party in advance. Further, the communication unit 101 determines a type of received packet so as to pass it to an appropriate processing unit in the client 1.

The I/O requesting unit 102 performs a process executed in a read/write system call which is called up by the user process.

The I/O request creating unit 102a of the I/O requesting unit 102 creates a packet for an I/O request based on real file information so that the client 1 sends the I/O request to the child server 3 directly, without involving the parent server 2. Then, if there is not the corresponding real file information in the file management table 105, the I/O requesting unit 102 sends a packet for requiring the real file information to the parent server 2.

The reception waiting unit 102b in the I/O requesting unit 102 waits incoming of a response packet based on an I/O which the I/O request creating unit 102a requests from the child server 3, and determines whether a type of the received packet is the I/O issuance (block I/O information) or an I/O processing completion notification to the disk device 4.

The I/O requesting unit 102 calls up the I/O issuing unit 102c when the packet is the I/O issuance, and calls up the I/O completion determining unit 102d when the packet is the I/O processing completion notification.

When the received packet type is the I/O issuance to the disk device 4, the packet includes information which indicates a certain point of a certain disk device 4 to be performed read/write processing for a certain length, and the I/O issuing unit 102c in the I/O requesting unit 102 converts the information into an passable format for a disk driver so as to call up the disk driver (issuance of a block I/O).

As for completion notification of the issued block I/O, a packet is sent back to a child server 3 to notify completion of the block I/O, which is instructed by the child server 3 receiving a packet therefrom, within an I/O completion interruption process.

When the received packet type is the I/O processing completion notification, the I/O completion determining unit 102d in the I/O requesting unit 102 confirms if the I/O requested by the I/O request creating unit 102a has been normally complete. In a case with normal completion, the operation goes back to the user process.

Abnormal completion has following two cases.

(1) An error occurs during the I/O.

(2) An error does not occur. However, a sequential virtual file to be I/O is in another child server.

In a case of (1), an error number is arranged and the operation goes back the user process.

In a case of (2), the corresponding real file information is taken out from the file management table 105 if there is, while if there is not the corresponding real file information in the file management table 105, a packet for requiring the real file information of the parent server 2 is sent and its reply is waited, then the operation goes back to the process of the I/O request creating unit 102a again when the replying packet is received from the parent server 2.

The real file information operating unit 103 performs a process to be executed in an open system call or the read/write system call which is called up by the user process.

The real file information obtaining unit 103a in the real file information operating unit 103 firstly examines if there is an entry for an i-node number of a virtual file to be opened in the file management table 105.

If there is, the process called up the open system call can refer the entry with the i-node number, so that the process has been completed.

If there is not, a packet is sent for inquiring of the parent server 2. After a reply is received from the parent server 2, the real file information registering unit 103b is called up.

Further, during the process within the read/write system call, the corresponding real file information is confirmed whether it is in the file management table 105 or not according to a current file offset and the i-node number of the virtual file to be I/O, and if there is not, a packet is sent for inquiring of the parent server 2, as well as the case above, and the real file information registering unit 103b is called up after a reply from the parent server 2 is received.

The real file information registering unit 103b in the real file information operating unit 103 registers received real file information into the entry for the corresponding i-node number in the file management table 105 (the entry is to be created if there is not) in order of file offset of the virtual file when the real file information is received from the parent server 2.

The offset updating unit 104 is called up in a seek system call which is called up by the user process to determine a location of a new offset in the virtual file, and examines whether there is the real file information corresponding to the offset in the file management table 105 or not. If there is, the offset updating unit 104 does no performance. If there is not, the offset updating unit 104 calls up the real file information obtaining unit 103a specifying a new offset specified so as to obtain the corresponding real file information from the parent server 2 as well as opening a file, and the real file information is registered in the corresponding entry in the file management table 105 by the real file information registering unit 103b.

The file management table 105 is where the real file information is registered, updated, and referred to when the user process calls up the open system call, the read/write system call, or the seek system call.

Further, the real file information is deleted there when it is recognized that a corresponding virtual file has been deleted or moved, or a directory in which the corresponding virtual file exists has been deleted or moved.

The file management table 105 has entries of every virtual file at each i-node number, and the respective entries include entries of each real file. The entries of each real file is discriminated its real file information with an offset in the virtual file for each real file.

The network file system processing unit 106 performs a process of the client in a network file system generally exists in the UNIX operating system or the like ("UNIX" is a registered trademark).

[Parent Server 2]

A system has one parent server 2, which manages a virtual file system and a virtual file. In general, the parent server 2 manages a plurality of virtual file systems.

The communication unit 201 performs communication between the parent server 2 and an arbitrary child server 3, or between the parent server 2 and an arbitrary client 1. The communication unit 201 uses a commonly-used communication protocol, such as TCP/IP, for communication so as to establish connection with each communication party in advance. Further, the communication unit 201 has a function of determining a type of received packet so as to pass it to an appropriate unit in the parent server 2.

The file management database 202 comprises a directory in a virtual file system, its file handle, a real file system size in a child server 3 corresponding to it, a mounted directory name, its file handle and each directory in a real file system, correspondence of its file handle and a virtual file of each directory in a virtual file system, and real file information in each child server 3 corresponding to it, and established by a commonly-used database software.

The virtual file managing unit 203 performs a process which is executed in a case where a relationship between a virtual file and a real file is over a plurality of child servers 3.

The real file termination processing unit 203a in the virtual file managing unit 203 detects termination of a real file while the client 1 performs an I/O processing to a certain child server 3 with respect to the real file, and besides receives a packet requesting real file information relating to a continuing real file with respect to the current real file from the client 1 when file size of the real file reaches or is over maximum length of the previously arranged real file. At that time, the database searching and updating unit 204 searches an entry of the virtual file to which the current real file in the file management data base 202 belongs, and the continuing real file information, with respect to the current real file information, in the entry is sent to the client 1.

A packet is sent from the client 1 for requesting new real file information when the user process of the client 1 updates an offset of the virtual file by the seek system call. At that time, the offset updating unit 203b in the virtual file managing unit 203 replies the real file information corresponding to the offset location to the client 1.

When a real file needs to be created in a case where a file with file creating attribute is opened by the client 1, where termination of a real file is detected, or where an offset is updated, the child server allocating unit 203c in the virtual file managing unit 203 allocates one child server 3 which manages the real file. In this allocation, a child server 3 next to (nearby) a child server allocated in a previous child server allocating process is allocated so that every child server 3 is allocated a real file as equally as possible.

The access permitting unit 203d in the virtual file managing unit 203 sends a packet to all child servers 3 to make them arrange access permissions so that the client 1 registered in the access permission list 203e can access the child server 3 upon issuance of a read/write request. This process is executed when an entire system is booted and when a client 1 is newly added. When a child server 3 is newly added, this packet is sent to the child server 3 only.

When a client 1 unmounts a parent server 2 mounted thereon, a packet is sent by the client 1 based on a general network file system procedure. The access permission list 203e in the virtual file managing unit 203 receives it and cancels access permission setting with respect to the client 1 in the virtual file system managed by the parent server 2.

The file handle creating unit 203f in the virtual file managing unit 203 refers to the access permission list 203e in order to confirm whether a client 1 has access permission or not when the parent server 2 receives a packet according to a mount protocol when the client 1 mounts the parent server 2.

If the client 1 is not registered the list, an error is set for the status and is sent to the client 1 through the communication unit 201.

On the other hand, when the client 1 is registered in the list, it is examined whether a file handle of a head directory in the virtual file system is in the file management database 202 or not by the database searching and updating unit 204. The file handle is created if the file handle does not exist yet, and registered in the file management data base 202 by the database searching and updating unit 204, then sent by the communication unit 201 to the client who has requested to be mounted.

Further, the file handle creating unit 203f is called up by the virtual file operating unit 203i upon receipt of a packet requesting creation of a directory on the virtual file system from the client 1, and creates one file handle for the entire virtual file system.

When the client 1 opens the virtual file, moves an offset of the virtual file, or detects a termination of the real file, the real file information obtaining unit 203g in the virtual file managing unit 203 obtains a file handle of the real file by the file handle obtaining unit 205a with respect to the corresponding child server 3 in cases where the file handle of the corresponding real file is not registered or the file information itself is not registered in the file management database 202. Next, it is registered in the file management database 202 by the real file information registering unit 203h, and is included in the real file information so as to be sent to the client 1.

The real file information registering unit 203h in the virtual file managing unit 203 registers the file handle of the real file which is obtained by the real file information obtaining unit 203g in the file management database 202 as a part of the real file information using the database searching and updating unit 204.

When a directory or a virtual file on the virtual file system has been created, deleted, or a name thereof has been updated by the client 1 based on the general network file system procedure, the virtual file operating unit 203i in the virtual file managing unit 203 receives a packet including those requests through the communication unit 201. When the directory is operated in the case above, the file handle creating unit 203f is called up to create a file handle for the directory in the virtual file system. Next, the real file operating unit 205c is called up to operate the real file or the directory in each child server, then the database searching and updating unit 204 adds, updates, or deletes the virtual file and the real file or the directory in the file management database 202.

The database searching and updating unit 204 is realized by using a function proposed by general database software.

In order to obtain a file handle of the real file in each child server 3, the file handle obtaining unit 205a in the child server managing unit 205 creates a packet, which includes a name of a target real file and a file handle of the directory in the real file system having the real file, for the child servers 3 based on a LOOKUP protocol, which a general network file system comprises, and obtains the file handle of the real file from a corresponding child server 3.

The mounting unit 205b in the child server managing unit 205 mounts every real file system managed by each child server 3 onto the parent server 2 by a general mount processing of the network file system. This process is performed when the whole system is started, or a child server 3 is added.

When a directory or a virtual file in the virtual file system has been created, deleted, or a name thereof has been updated by the client 1, the real file operating unit 205c in the child server managing unit 205 is called up by the virtual file operating unit 203i so that the file or the directory is created, deleted, or the name thereof is updated thereby, which is a general network file system procedure, with respect to all child servers 3 in a case of operation for the directory, and to a corresponding child server 3 in a case of operation for the file.

When a capacity of a real file system in a child server 3 is extended, for example, a new disk device is added, in a case where the real file system managed by the child server 3 has a function of extending the capacity of the file system dynamically, the real file system extending unit 205d in the child server managing unit 205 is sent a packet notifying the above by the child server 3 in order to reflect it in the file management database 202 in the parent server 2. At that time, the real file system extending unit 205d updates an entry of the corresponding real file system in the file managing database 202 using the database searching and updating unit 204.

When a new child server 3 is added according to an instruction of a system administrator in order that a capacity of the virtual file system is extended, the child server adding unit 205e in the child server managing unit 205 mounts a real file system of the child server 3 according to an IP address of the specified child server 3 and to a name of a directory to be mounted using the mounting unit 205b, and obtains the capacity of the real file system with the general network file system procedure. Next, a new entry of the real file system is arranged in the file management database 202 by the database searching and updating unit 204, and only directory information is copied. Further, a directory is created by the real file operating unit 205c based on the directory information.

[Child Server 3]

The child server 3 manages each of a real file system and a real file regardless of existence of a virtual file system and a virtual file. In general, there is a plurality of child servers 3 in a system. Besides, the child server 3 establishes one real file system over a plurality of disk devices 4, and manages a plurality of the real files therein.

The communication unit 301 performs communication between the child server 3 and the parent server 2, or the child server 3 and an arbitrary client 1. The communication unit 301 establishes a connection with each communication party in advance using a general communication protocol, such as TCP/IP, for the communication. Further, the communication unit 301 determines a type of received packet to pass it to an appropriate processing unit in the child server 3.

The access permitting unit 302a in the real file managing unit 302 registers a list of client permitted access, which is sent by the access permitting unit 203d in the parent server 2, in the access permission list 302b. Further, the access permitting unit 302a examines whether a client who has sent an I/O request using the I/O request creating unit 102a in the client 1 is registered in the access permission list 302b or not.

If the client is not registered, the access permitting unit 302a sends back a packet indicating an error to the client. If the client is registered, based on the I/O request, the access permission list 302b in the real file managing unit 302 is updated or referred with an IP address list of the client 1 permitted the access.

The real file system managing unit 303 has a server function of the general network file system and a file managing function of a file system managed by a child server 3, which exist in an operating system of the child server 3.

There is no need for all child servers to use the same type of file system. File systems can be different at each child server 3 as long as the file systems support an interface of a general UNIX operating system.

It is the client 1 that issues an I/O practically to the disk device 4, so that the I/O issuing unit 102c of the client 1 need to be passed information indicating a certain point of a certain disk device 4 where read/written processing is performed, and a certain length to be read/written (block I/O information). The block I/O unit 304 receives the above information from the real file system managing unit 303, and replies to a client 1, which has sent an I/O request, sending a packet including the information. Further, upon receipt of a packet indicating I/O completion to a disk device 4 by a client 1, the block I/O unit 304 notifies the real file system managing unit 303 of it.

[Disk Device 4]

Figure 1:
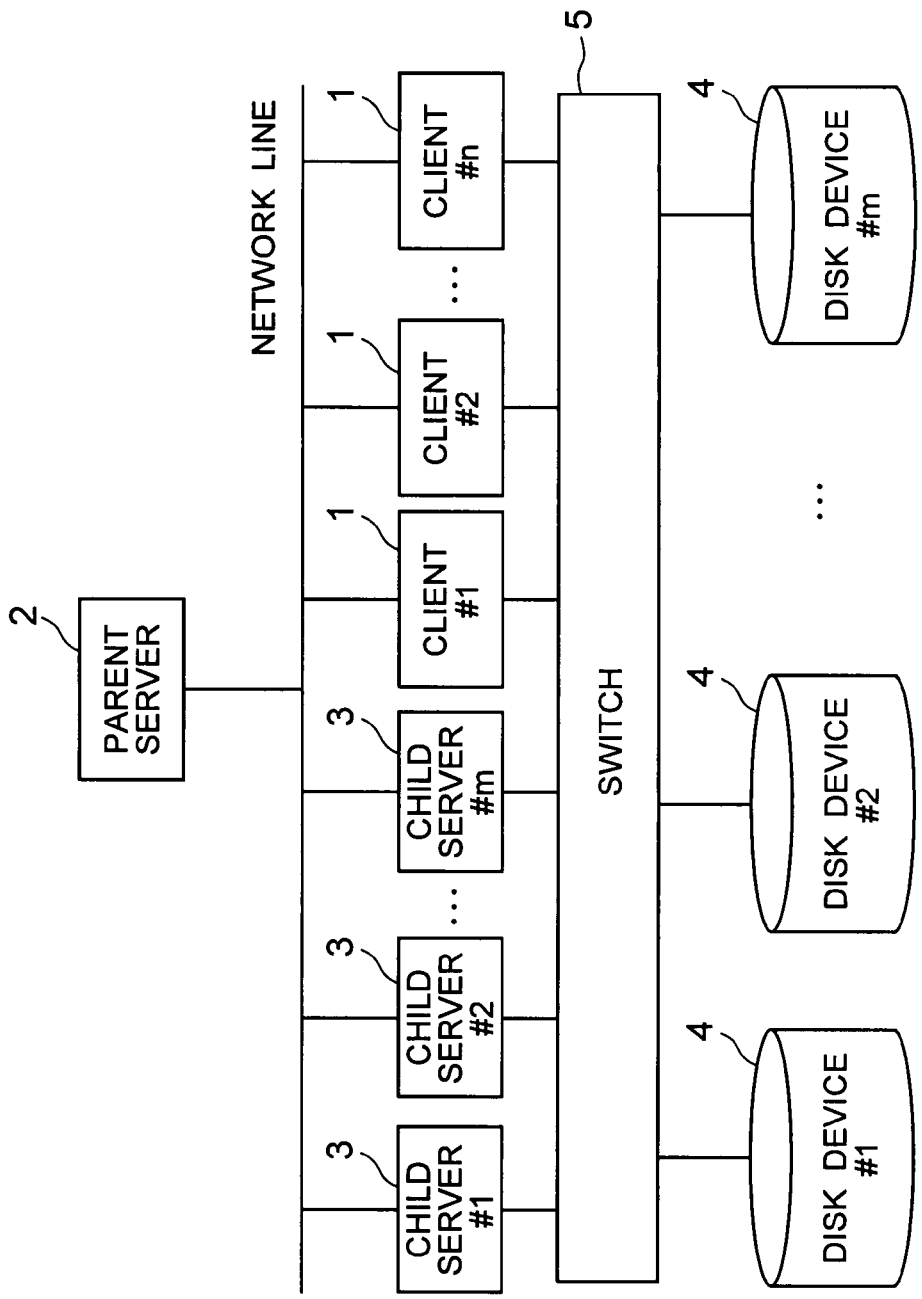
FIG. 1 is a conceptual diagram showing connection between client computers, child server computers, and a parent server computer, and connection between disk devices, a client computer, and child server computers.

The disk device 4 is a general recording medium capable of random access, and is connected to the switch 5 corresponding to an I/O protocol such as a fiber channel, as shown in FIG. 1, so as to be accessible by the child server 3 and the client 1.

[Description for Operations]

Next, operations of the present embodiment will be described specifically with reference to block diagrams of FIGS. 2 and 4-6, and flowcharts and sequence diagrams of FIGS. 7-10.

Because operations of each unit have a plurality of phases as follows, explanations will be pursued at each category.

When a system is constructed (constructing a child server)
When a system is constructed (access permission);
When a client mounts the parent server;
When a client opens a virtual file;
On an I/O processing (read/write processing); and
When an offset is moved.

[When a System is Constructed (Constructing a Child Server)]

In FIG. 5, depending on the system administrator, real file systems of each child server are mounted by the child server adding unit 205e using the mounting unit 205b according to IP addresses and names of directories to be mounted in all child servers 3, and file system capacity of each real file system is obtained by a general network file system procedure.

Next, the child server adding unit 205e arranges new entries for real file system as many as the number of real file systems in the file management database 202 by using the database searching and updating unit 204.

[When a System is Constructed (Access Permission)]

In FIGS. 5 and 6, the system administrator sets IP addresses of each client 1, who is permitted access to a virtual file system managed by the parent server 2, in the access permission list 203e using the access permitting unit 203d.

Next, the access permitting unit 203d sends a packet to the real file system managing units 303 of all managed child servers 3 in order to make them arrange access permission based on IP addresses of all clients in the access permission list 203e.

[When a Client Mounts the Parent Server]

In FIGS. 4 and 5, the client 1 performs a mounting process with respect to the parent server 2 managing a virtual file system, as well as a case with a general network file system, by the network file system processing unit 106, which has a function of a client in a general network file system, through the communication unit 101. In the process, upon receipt of a packet according to a mount protocol of the above general network file system through the communication unit 201, the parent server 2 firstly refers to the access permission list 203e using the file handle creating unit 203f, and confirms whether the client 1 which has requested for mounting is registered in the list or not. If it is not registered, the mount request is unauthorized from the client 1 without access permission, so that an error-status is set, and is sent back to the client 1 through the communication unit 201. On the other hand, if the client 1 which has requested for mounting is registered in the list, the file management database 202 is examined whether it has a file handle of a head directory in the virtual file system or not by the database searching and updating unit 204. In a case where the file handle is not exist yet, the file handle is created to be registered in the file management data base 202 by the database searching and updating unit 204, and is sent back to the client 1 which has requested for mounting by the communication unit 201.

Next, the client 1 which has received the file handle through the communication unit 101 stores the file handle received from the parent server 2 with the network file system processing unit 106.

[When a Client Opens a Virtual File]

According to FIGS. 4-8, as for a process of opening a virtual file, a file handle of a directory is firstly obtained from the parent server 2, and then real file information is obtained. There are following ways to obtain the real file information depending on conditions.

Condition 1:

This is a case where relevant real file information is already registered in the file management table 105 of a client 1.

The case has a least troublesome for processing, and the procedure is concluded within the client 1.

Condition 2:

This is a case where the real file information is not registered in the file management table 105 in the client 1, while the relevant real file information is registered in the file management database 202 in the parent server 2.

There is no need for the child server 3 to be inquired in this case, therefore, communication can be performed between the client 1 and the parent server 2 only.

Condition 3:

This is a case where the real file information is registered in neither the file management table 105 of the client 1 nor the file management database 202 of the parent server 2, so that the corresponding child server 3 needs to be inquired.

The case has the most troublesome, and needs communication between the client 1 and the parent server 2, the parent server 2 and the child server 3 (a communication pathway in this case is shown with a dotted line in FIG. 2 as "a transferring path for a control packet on opening").

Here, the real file information comprises:
an IP address of a child server in which the real file exists;
a file handle of the real file;
a maximum length of the real file;
a termination flag (a flag indicates that the real file is a last in the virtual file);
an offset of the real file with respect to the virtual file; and
a file handle of a directory in which the virtual file exists.

Figure 7:
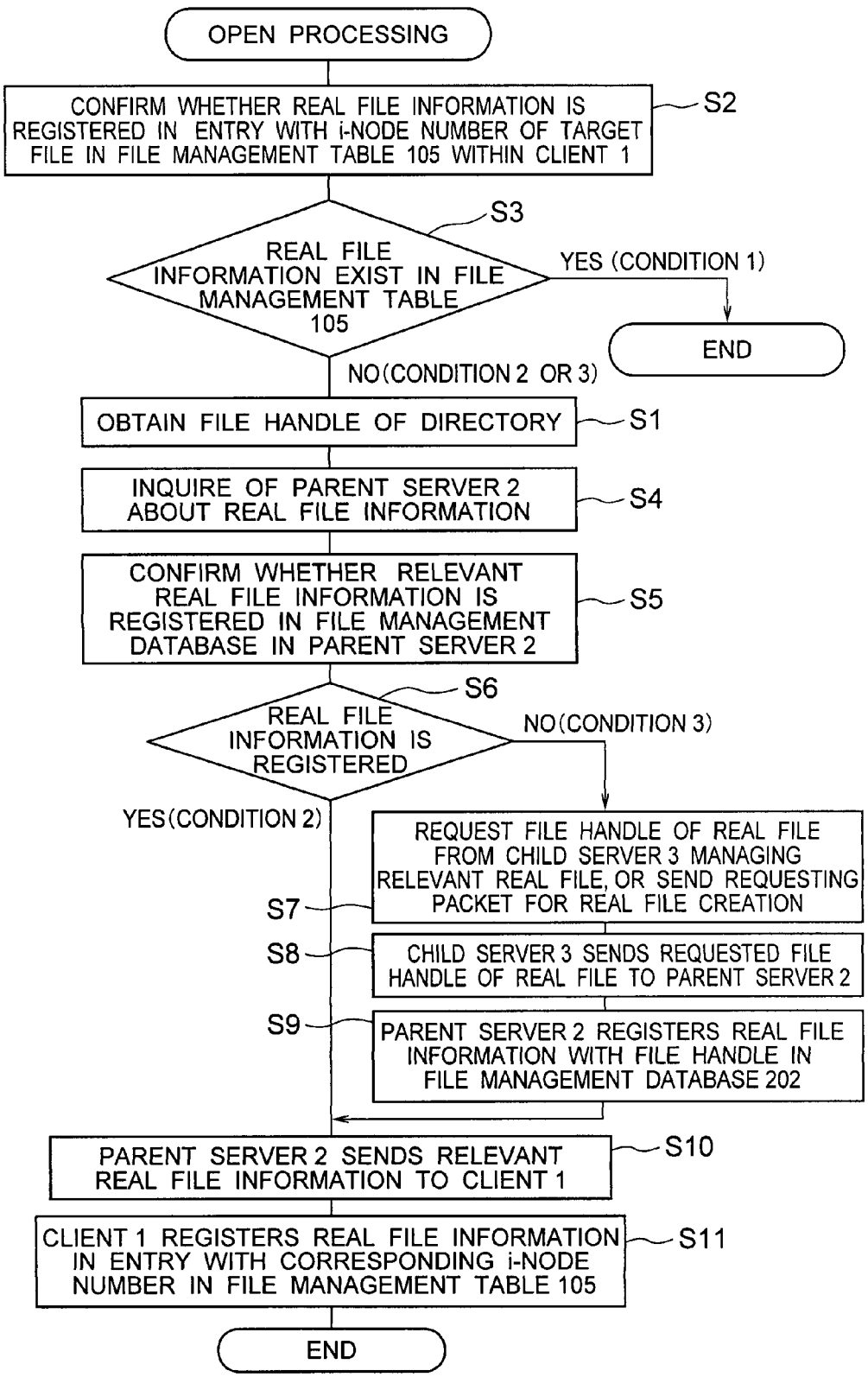
FIG. 7 is a flowchart showing an outline for a processing when a client opens a virtual file.

Firstly, in a process within the open system call called up by the user process of the client 1, the real file information obtaining unit 103a uses an i-node number of a target file to be opened to examine whether there is an entry with the relevant i-node number in the file management list 105 or not (Steps S2 and 23 in FIG. 7). If there is (Condition 1), the real file information can be taken out from the entry in a following I/O processing, so that the open processing is concluded (the file management table 105 has entries at each i-node number).

If there is not the relevant entry in the file management table 105, the real file information obtaining unit 103a performs LOOKUP, which is similar to a function of a client in a general network file system, until reaching a target file tracing a directory tree, and a file handle of directory, which is returned by the parent server at each LOOKUP, is stored by a function of the client in the network file system, as well as the above mentioned case on mounting.

In the procedure, within the parent server 2, the file handle creating unit 203f searches the file management database 202 through the database searching and updating unit 205 every time when the LOOKUP packet is received through the communication unit 201, and creates a file handle if there is not the file handle corresponding to the directory name, then registers it in the file management database 202 using the database searching and updating unit 205. After that, the file handle is sent to the client 1 through the communication unit 201 (Step S1 in FIG. 7).

Next, when the file to be opened is reached after the LOOKUP processing in the client 1, the real file information obtaining unit 103a sends the parent server 2 a file name of the file to be opened, the file handle of the directory to which the file to be opened belongs, and an attribute which is passed to the open system call as an argument through the communication unit 101 so as to inquire the real file information (Step S4 in FIG. 7).

The attribute is information indicating whether a file to be opened should be newly created, whether a file to be opened should be read later, written later, or read and written later, and if the file is to be written, whether it is APPEND or not. It is specified by the user process. Here, an APPEND attribute means that data to be written is added at a termination of a file in a case where the existing file is to be written after opened. If there is no APPEND attribute, the existing file is to be overwritten from a top of the file.

The parent server 2 which receives a packet requesting for obtaining the real file information from the real file information obtaining unit 103a in the client 1 through the communication unit 201 searches the file management database 202 through the database searching and updating unit 204 based on the file handle of the directory to which the file to be opened belongs and the file name of the file to be opened using the real file information obtaining unit 203g (Steps S5-6 in FIG. 7).

When the attribute is "write" and "APPEND", the parent server 2 searches the real file information including an end of the virtual file.

As a result of the above search, there are following cases.
(1) There is no relevant entry to be found, and the attribute is for creating a file;
(2) A relevant entry is found, while the real file information is not registered; and (3) There is a relevant entry, and the real file information is registered.

Firstly, in the case of (1), the real file information obtaining unit 203g allocates one child server 3 using the child server allocating unit 203c, and creates a real file in a relevant directory in the allocated child server 3 by the real file operating unit 205c (Step S7 in FIG. 7). In the process, the file handle of the created real file is returned from the child server 3 (Step S8 in FIG. 7), and the real file information registering unit 203h creates a relevant entry in the file management database 202 through the database searching and updating unit 204 so as to register the real file information including the file handle (Step S9 in FIG. 7).

Next, the searched real file information is sent to the client 1 (Step S10 in FIG. 7). In client 1, the real file information obtaining unit 103a registers the received real file information using the real file information registering unit 103b in an entry of a relevant i-node number in the file management table 105 (the entry is to be created if there is not).

Further, in the case of the search result (2), the real file information obtaining unit 203g obtains the file handle of the real file with the file handle obtaining unit 205a from the corresponding child server 3 (Steps S7-8 in FIG. 7). Then, the real file information registering unit 203h creates the relevant entry in the file management database 202 through the database searching and updating unit 204 so as to register the real file information including the file handle (Step S11 in FIG. 7).

Next, the searched real file information is sent to the client 1 (Step S10 in FIG. 7). In client 1, the real file information obtaining unit 103a registers the received real file information in the entry with the corresponding i-node number in the file management table 105 (the entry is to be created if there is not) through the real file information registering unit 103b (Step S11 in FIG. 7).

In the case of the search result (3), the real file information obtaining unit 203g sends the client 1 the searched real file information (S10 in FIG. 7). In the client 1, the real file information obtaining unit 103a registers the received real file information in the entry with the corresponding i-node number in the file management table 105 (the entry is to be created if there is not) using the real file information registering unit 103b (Step 11 in FIG. 7).

Figure 8:
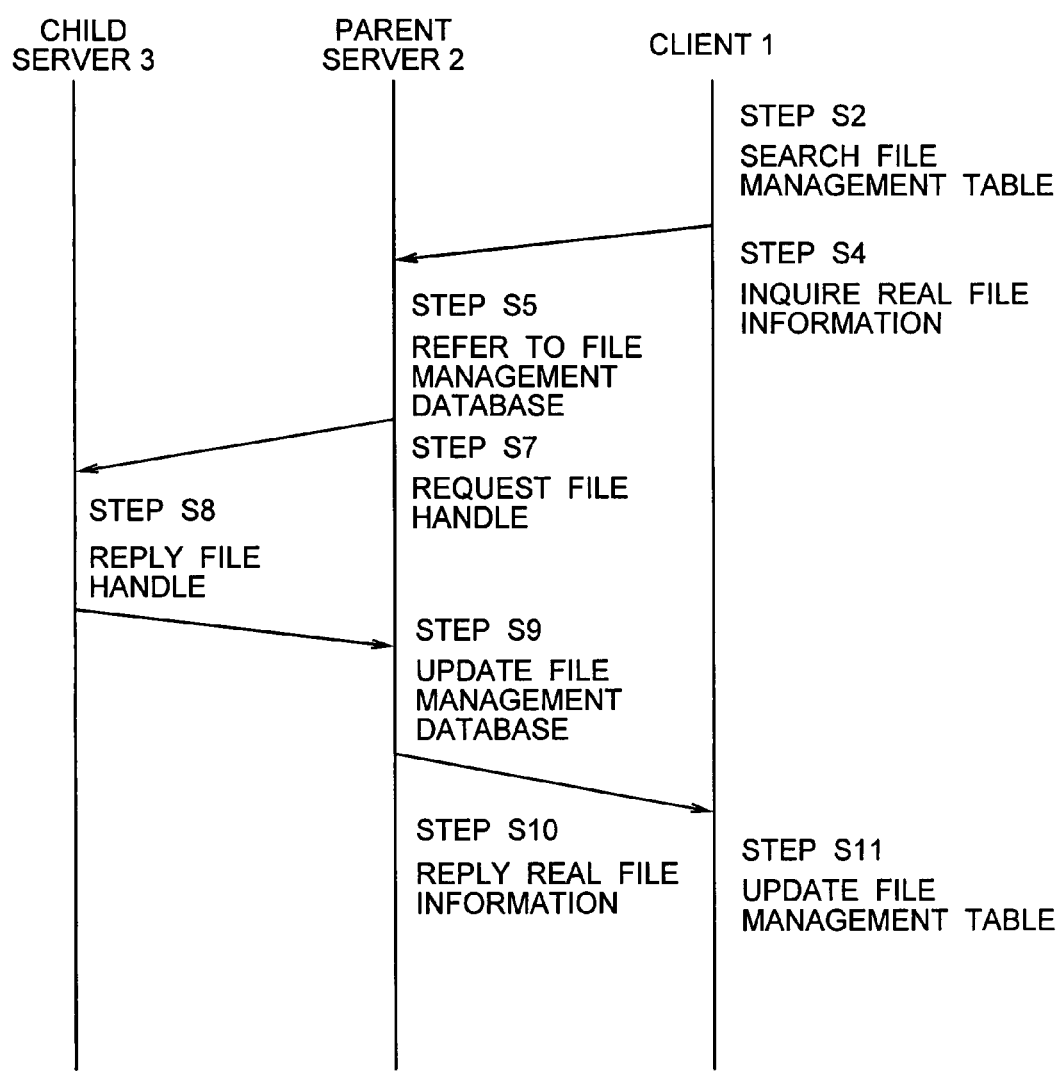
FIG. 8 is a sequence diagram showing a simplified processing flow relating to a file handle obtaining in the case where real file information is not registered either in a client nor a parent server and a child server needs to be inquired.

FIG. 8 shows a sequence in the case of the condition 3, that is, a file handle of real file is obtained from a client 1 to the parent server 2, and from the parent server 2 to a child server 3, and in the result, the real file information is registered in the file management database 202 of the parent server 2, and the real file information is returned to the client 1, then it is registered in the file management table 105.

[On an I/O Processing (Read/Write Processing)]

Figure 9:
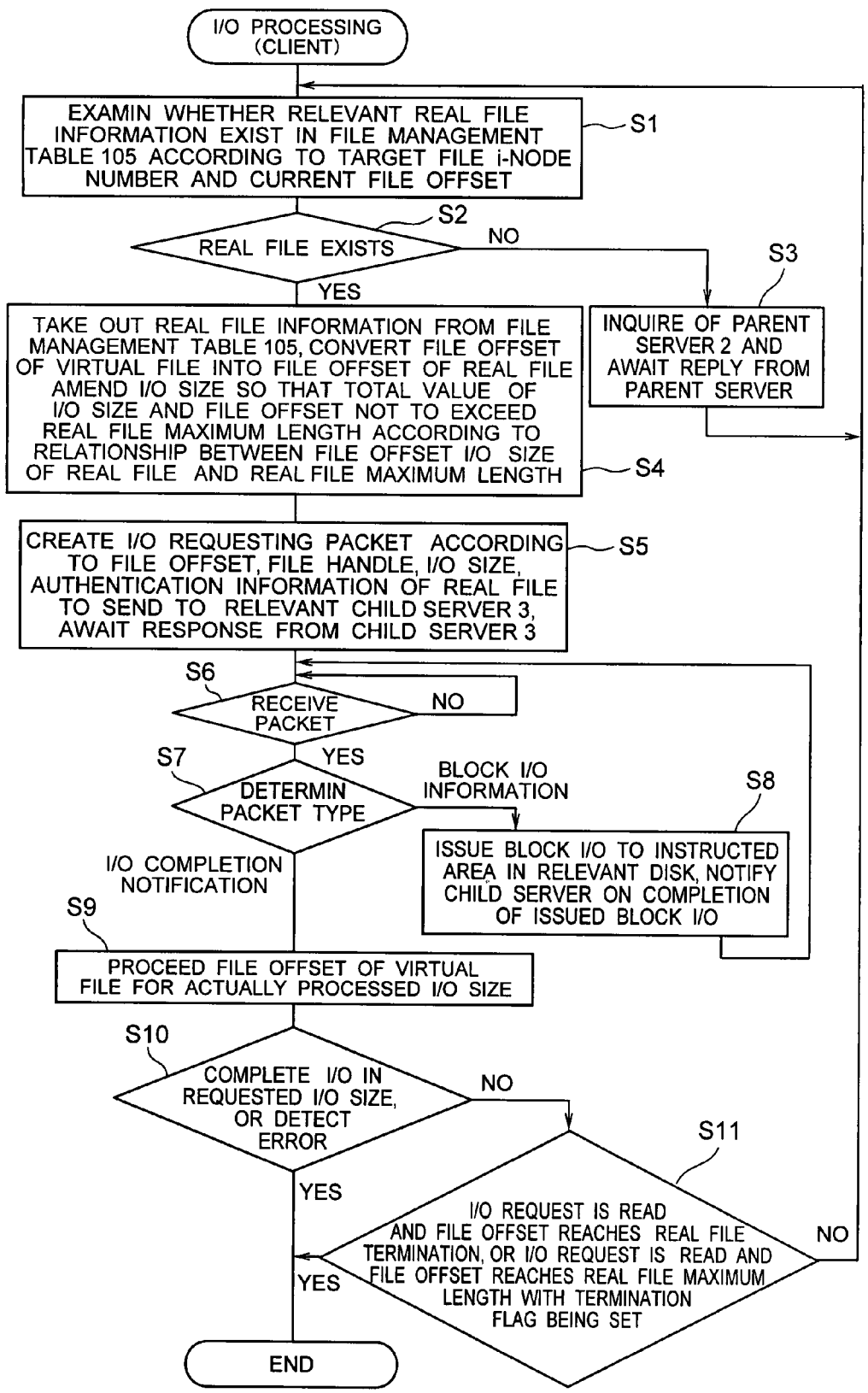
FIG. 9 is a flowchart showing an outline for client operation in an I/O processing.

In a process within the read or write system call called up by the user process of the client 1, according to the flowchart in FIG. 9 and the block diagrams in FIGS. 4-6, the I/O request creating unit 102a refers to an entry corresponding to an i-node number in a virtual file to be I/O in the file management table 105, and examines real file information in the entry in order based on a current file offset value in the virtual file (Step S1 in FIG. 9). If there is the real file information corresponding to the file offset (Step S2 in FIG. 9), it is taken out. If there is not, the real file information obtaining unit 103a sends a packet to inquire of the parent server 2 about the real file information on the relevant real file, and awaits its reply (Step S3 in FIG. 9).

Next, a file offset in the virtual file is converted into an offset based on a top of the real file (a file offset of the real file), and according to a relationship between the file offset of the real file, an I/O size, and a maximum length of the real file, total value of the I/O size and the file offset is amended not to exceed the maximum length of the real file. The difference between the requested I/O size and the amended I/O size is processed when the procedure is back to Step S1 after Steps S10-S11 in FIG. 9 (Step S4 in FIG. 9).

Then, the I/O requesting packet is created based on the file offset of the real file, the file handle, the I/O size, and authentication information so as to be sent to the corresponding child server 3, and a response from the child server 3 is awaited by the reception waiting unit 102b (Step S5 in FIG. 9).

When a packet is received from a child server 3 (Step S6 in FIG. 9), the received packet may be either of two types, block I/O information or I/O completion notification.

The packet type is determined according to a flag within the packet (Step S7 in FIG. 9), and when it is the block I/O information, the I/O issuing unit 102c issues a block I/O to a relevant portion of a relevant disk device 4 based on the block I/O information included in the packet. After the issuance, returning to Step S6 again, and the client 1 awaits a packet. The completion notification for the issued block I/O is performed in such a manner that, in a process of the I/O completion interruption, the I/O issuing unit 102c replies a packet for notifying completion of the instructed block I/O to the child server 3 from which the instruction packet has been received (Step S8 in FIG. 9).

When the received packet from the child server 3 is the I/O completion notification, the client 1 proceeds the file offset of the virtual file for actual processed size of the I/O returned from the child server (Step S9 in FIG. 9), checks a completion status of the I/O (checking an error), and if there is no error and the I/O with the requested size is completed, the I/O processing is completed (Step S10 in FIG. 9).

If there is no error and the I/O with the requested size is not completed, and besides, if the I/O request is "write", which means that the real file has been processed with I/O for the maximum length, the procedure goes back to Step 1 (Step S11 in FIG. 9), then next real file information is taken out.

If a case is with "read", and an file offset of the real file reaches a termination of the real file, or, the file offset of the real file reaches the maximum length of the real file, in addition, a termination flag is set, which means that the virtual file has been "read" until its end, the I/O processing is completed (Step S10 in FIG. 9).

If a case with "read", and with other conditions than the above, which means that there is a real file to be read next, the procedure goes back to Step S1, and next real file information is taken out (Step S11 in FIG. 9).

When there is an error, an error number is arranged, and the I/O processing is completed (Step S10 in FIG. 9).

Figure 10:
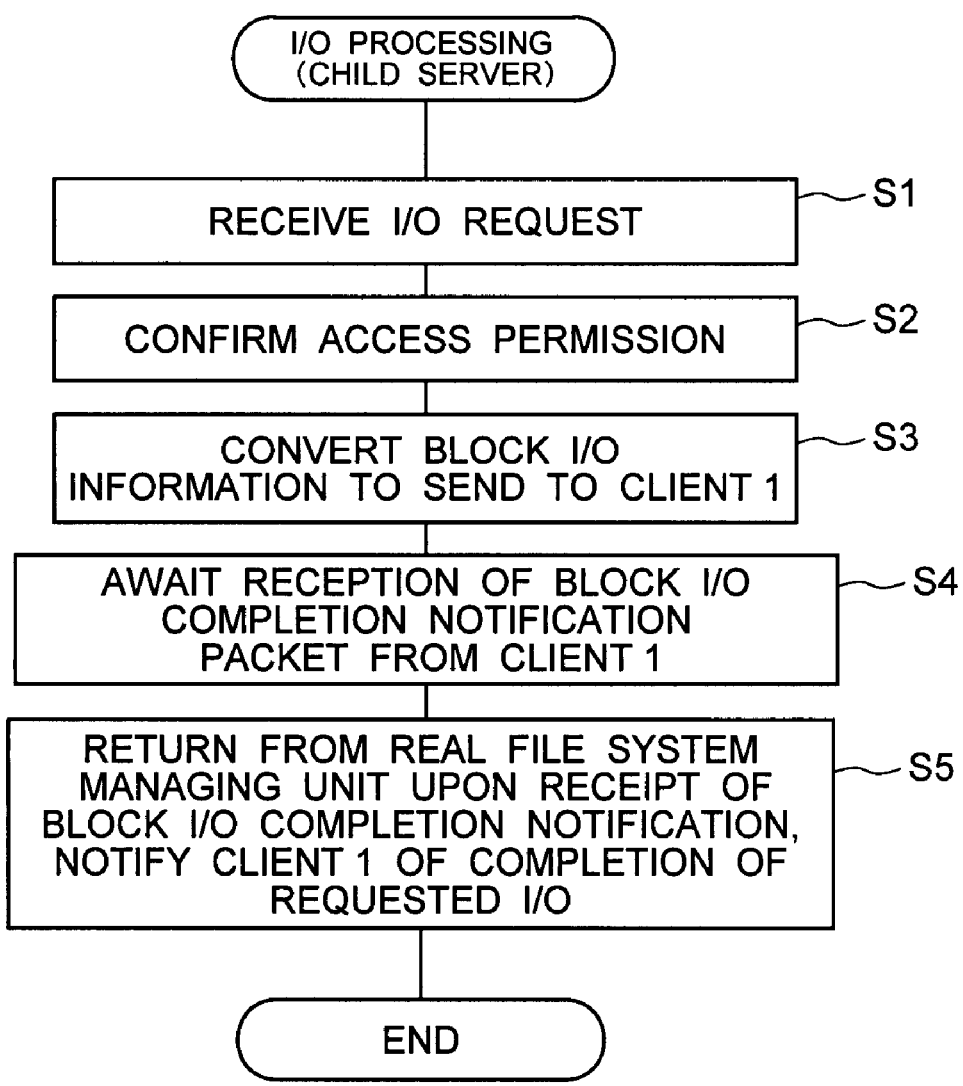
FIG. 10 is a flowchart showing an outline for child server operation in an I/O processing.

Next, as for a process in the child server 3 which receives the I/O request from the client 1, according to a flowchart in FIG. 10, and block diagrams in FIGS. 4-6, in the child server 3 which has received the I/O requesting packet (Step S1 in FIG. 10), the access permitting unit 302a confirms whether the client has access permission or not (Step S2 in FIG. 10).

Next, the real file system managing unit 303 converts the real file information into information identifying a portion to be performed with I/O in the target real file with a certain address in a certain disk device 4, from where a block is to be read or written, and a certain number of the blocks to be read or written (block I/O information) after the authentication information is checked, and the block I/O unit 304 replies the above block I/O information to the client which has sent the I/O request (Step S3 in FIG. 10).

Then, the child server 3 awaits a packet indicating completion notification of the block I/O from the client 1 to receive (Step S4 in FIG. 10).

Receiving a packet indicating completion notification of the block I/O from the client 1, the child server 3 confirms whether the block I/O has been normally completed or it ends up in an error.

In a case with an error, an error status is set as a status of the I/O completion notification to be returned to the client 1, and a packet notifying it is sent back to the client 1.

In a case of normal completion, a status of normal completion is set as a status of the I/O completion notification to be returned to the client 1, and a packet notifying it is sent back to the client 1 (Step S5 in FIG. 10).

[When an Offset is Moved]

As for a process within the seek system call called up by the user process in the client 1, according to block diagrams in FIGS. 4-6, a new position of a file offset in the virtual file system is calculated according to a value of argument which has passed to the seek system call using the offset updating unit 104, and the file management table 105 is searched using an i-node number of the target virtual file and the calculated value of the new file offset so as to be examined whether there is the relevant real file information or not.

If there is the real file information, no processing is performed. If there is not, the real file information obtaining unit 103$a$ inquires of the parent server 2 about the real file information of the relevant real file, and the real file information replied from the parent server 2 is registered in a corresponding entry in the file management table 105 by the real file information registering unit 103$b$.

As described above, according to the present embodiment, the I/O data relating to read or write is processed without servers (the parent server 2 and the child servers 3), so that system resources, such as a memory and a CPU in the servers, can be prevented from being used unnecessarily.

Further, when the read/write system call is called up, the parent server 2 which is only one in the system does not need to perform communication, so that there is no load on the parent server 2. Accordingly, processing of the parent server 2 cannot be a bottleneck in processing of the entire file system, and I/O processing is performed smoothly even with a heavy-loaded I/O. The reason is that communication between the client 1 and the parent server 2, or the parent server 2 and the child server 3 is performed only when the client 1 calls up a file-open (a process on calling up the open system call) or move of a file offset (a process on calling up the seek system call), unless a real file termination is detected, and besides, communication is required only between the client 1 and the child server 3 when the read/write system call is called up. In general, it is considered that calling frequency of the open or seek system call is less than calling frequency of the read/write system call.

Moreover, when a file is created, the parent server 2 takes an algorithm, which determines a child server 3 to create a real file, where the number of child server 3 increases from the smallest number (refer to lines 10-19 in page 19), so that real files are allocated to every registered child server 3 evenly without relying on the client 1 which has requested for creating a file. Accordingly, when a number of I/O requests are issued, each request is distributed to the respective child servers, and load on a child server 3 is reduced.

Further, a large file over a plurality of child servers 3 can be created, and if the file is processed with I/O in sequential access, the I/O processing is performed more efficiently. The reason is as follows. When a real file size in a child server 3 exceeds a certain value upon creation of a new file, a rest of the file is created in a next child server 3 (refer to line 16 in page 18-line 3 in page 19, lines 8-17 in page 36). Accordingly, the parent server 2 needs to be communicated only when the creation is moved to a next child server 3. In addition, when a termination of a real file is detected in a case where a file is read in, or where an existing file is overwritten, the client 1 notifies the parent server 2 of that, and the parent server 2 sends the client 1 an address and a file handle of the next child server (the real file information), so that the client 1 can issues an I/O request to the target child server 3 in which the next real file exists in a virtual file to be performed I/O.

Further, a plurality of clients 1 can write into different real files in the same virtual file at the same time as long as each real file is different, even if the virtual file is the same.

Moreover, a new child server 3 and a disk device 4 managed thereby can be added to the parent server 2 while the system is operated, the file system can be extended during the system is in operation.

INDUSTRIAL APPLICABILITY

In an area where large data needs to be processed rapidly, such as HPC (High Performance Computing), it is said that data is easier to handle generally when a file is stored in one large-capacity file system than when one data is divided into a plurality of files so as to be distributed into a plurality of file systems for storage. Therefore, the present invention is applicable to the area such as the HPC.

Further, when a MPI (Message Passing Interface) job is operated in a plurality of clients, the plurality of clients may issue I/O respectively to different portions in a large file at the same time. According to the present invention, different portions in a large file can be issued I/Os such as for write-in at the same time when real files are different, so that processing such as creation of a large file can be performed efficiently. Therefore, the present invention is suitable for an area such as the MPI.

What is claimed is:

1. A file sharing system comprising:
a plurality of disk devices;
a plurality of child server computers, each of the plurality of child server computers manages one of the disk devices;
a parent server computer configured to manage the plurality of child server computers; and
a plurality of client computers, wherein
the disk devices store a large divided file,
the plurality of client computers, the plurality of child server computers, and the parent server computer are connected through a network,
the plurality of disk devices, each of the plurality of client computers, and each of the plurality of child server computers are connected through a channel switch so that at least each of the plurality of client computers can directly access the plurality of disk device; and
the parent server computer comprising:
a child server managing unit configured to create real file information, wherein the created real file information specifies a structure of a real file system in each of the disk devices, a structure of a virtual file system over the real file system, and a stored position of a real file in the virtual file system, and
a file management database configured to store created real file information,
each of the plurality of client computers comprising:
a real file information obtaining unit configured to send a request to the parent server computer through the network so as to obtain real file information corresponding to a target file from the parent server computer upon a file-open operation;

a real file information registering unit configured to register the real file information obtained by the real file information obtaining unit in a file management table within the respective one of the plurality of client computers; and an I/O requesting unit comprising the functions of: determining whether the real file information corresponding to the target file is stored or not in the file management table upon the file-open operation; sending a request of input/output processing directly to the corresponding child server computer based on the real file information stored in the file management table in a case the target file is stored in the file management table; sending a request to the parent server computer through the network so as to obtain the real file information corresponding to the target file from the parent server computer in a case the target file is not stored in the file management table; and sending a request of inputting/outputting processing directly to the corresponding child server computer based on the obtained real file information so as to perform input/output processing relating to a file operation accessing directly the disk devices through the channel switch according to block I/O information sent by the child server computer.

2. A file sharing method with each of a plurality of child server computers managing a plurality of disk devices individually, a parent server computer managing the plurality of child server computers, and a plurality of client computers are connected communicably, and a large file is divided to be stored in the disk devices, the method comprising the steps of:

connecting the plurality of client computers, the plurality of child server computers and the parent server computer through a network; and the plurality of disk devices, the respective client computers, and the respective child server computers are connected through a channel switch so that at least each of the plurality of client computers can directly access the plurality of disk devices; and registering in advance real file information for specifying a structure of a real file system in each of the plurality of disk devices, a structure of a virtual file system over the real file systems, and stored position of the real file in the virtual file system, into the parent server computer as a file management database;

upon file-open operation by a respective client computer, determining whether or not the real file information corresponding to a target file is stored in a file management table included by the respective client computer;

starting input/output processing relating to file operation by sending a request for input/output processing directly to the corresponding child server computer when the real file information is stored in the file management table; and obtaining the real file information corresponding to the target file from the parent server computer by sending a request to the parent computer server through the network when the real file information is not stored in the file management table; storing the obtained real file information in the file management table; and directly accessing, by the respective client computer, the disk device through the channel switch so as to perform input/output processing relating to the file operation based on the real file information.

3. The file sharing method, as claimed in claim 2, wherein the respective client computer requests from the parent server computer of the real file, information of a real file continuing from the real file, when the real file termination is detected in the disk device during the input/output processing relating to the file operation by the respective client computer to the respective disk device based on the real file information.

* * * * *